US012736687B2

(12) United States Patent
Liu et al.

(10) Patent No.: US 12,736,687 B2
(45) Date of Patent: Sep. 15, 2026

(54) ACQUISITION APPARATUS, ACQUISITION SYSTEM, AND CONTROL METHOD FOR MULTI-SOURCE AERIAL REMOTE SENSING DATA

(71) Applicant: CHINA RAILWAY DESIGN GROUP CO., LTD., Tianjin (CN)

(72) Inventors: Guiwei Liu, Tianjin (CN); Qihao Sun, Tianjin (CN); Liguo Zhang, Tianjin (CN); Hu Cao, Tianjin (CN); Qingguo Cui, Tianjin (CN); Zelian Chen, Tianjin (CN); Jing Gao, Tianjin (CN); Fei Wang, Tianjin (CN); Xuanyu Zhang, Tianjin (CN); Guangxue Ren, Tianjin (CN); Feng Zuo, Tianjin (CN); Jingtao Li, Tianjin (CN)

(73) Assignee: CHINA RAILWAY DESIGN GROUP CO., LTD., Tianjin (CN)

( * ) Notice: Subject to any disclaimer, the term of this patent is extended or adjusted under 35 U.S.C. 154(b) by 0 days.

(21) Appl. No.: 19/095,058

(22) Filed: Mar. 31, 2025

(65) Prior Publication Data

US 2026/0118522 A1 Apr. 30, 2026

Related U.S. Application Data

(63) Continuation of application No. PCT/CN2024/100929, filed on Jun. 24, 2024.

(30) Foreign Application Priority Data

Feb. 26, 2024 (CN) ......................... 202410204824.4

(51) Int. Cl.

*G01S 19/49* (2010.01)
*B64D 43/00* (2006.01)

(Continued)

(52) U.S. Cl.

CPC .............. *G01S 19/49* (2013.01); *B64D 43/00* (2013.01); *G01S 7/497* (2013.01); *G01S 17/89* (2013.01); *H04N 23/11* (2023.01); *H04N 23/13* (2023.01)

(58) Field of Classification Search

CPC .......... G01S 19/49; G01S 7/497; G01S 17/89; B64D 43/00; H04N 23/11; H04N 23/13

See application file for complete search history.

(56) References Cited

U.S. PATENT DOCUMENTS 5,894,323 A * 4/1999 Kain ...................... G01C 11/02 348/116
7,298,869 B1 * 11/2007 Abernathy ............. G06V 10/98 324/330

(Continued)

FOREIGN PATENT DOCUMENTS

CN 104730539 A 6/2015
CN 204556829 U 8/2015

(Continued)

OTHER PUBLICATIONS

Sun Zhong-Yu, et al. Small unmanned aerial vehicles for low-altitude remote sensing and its application progress in ecology, Chinese Journal of Applied Ecology, 2017, pp. 528-536, vol. 28 No. 2.

*Primary Examiner* — Abdalla A Khaled
(74) *Attorney, Agent, or Firm* — Bayramoglu Law Offices LLC

(57) ABSTRACT

An acquisition apparatus, an acquisition system, and a control method for multi-source aerial remote sensing data are applied to the field of aerial survey and remote sensing technology. The acquisition apparatus for multi-source aerial remote sensing data includes: a flight platform and onboard equipment arranged on the flight platform; wherein the onboard equipment includes: a multi-sensor ultra-com- (Continued)

pact integrated device, an onboard integrated synchronization control device, and a GNSS receiving antenna; the multi-sensor ultra-compact integrated device is connected to the onboard integrated synchronization control device via a cable, and the GNSS receiving antenna is arranged on an upper end face of the flight platform; the multi-sensor ultra-compact integrated device is configured to acquire multi-source remote sensing data; and the onboard integrated synchronization control device is configured to control the operation of the multi-sensor ultra-compact integrated device.

12 Claims, 7 Drawing Sheets

(51) Int. Cl.

| | |
|---|---|
| ***G01S 7/497*** | (2006.01) |
| ***G01S 17/89*** | (2020.01) |
| ***H04N 23/11*** | (2023.01) |
| ***H04N 23/13*** | (2023.01) |

(56) References Cited

U.S. PATENT DOCUMENTS

| | | | | |
|---|---|---|---|---|
| 9,116,982 | B1 * | 8/2015 | Stern | G06F 16/285 |
| 9,420,432 | B2 * | 8/2016 | Matthews, III | H04M 1/72463 |
| 9,476,730 | B2 * | 10/2016 | Samarasekera | G01C 21/3852 |
| 9,784,835 | B1 * | 10/2017 | Droz | G08G 1/165 |
| 10,155,584 | B2 * | 12/2018 | Wang | B64C 25/32 |
| 10,921,245 | B2 * | 2/2021 | Bennett | G06T 7/73 |
| 12,007,276 | B2 * | 6/2024 | Chandrasekar | G02B 21/361 |
| 12,429,878 | B1 * | 9/2025 | Cheng | G01S 17/89 |
| 2013/0226344 | A1 * | 8/2013 | Wong | B25J 9/1697<br>901/1 |
| 2019/0064364 | A1 * | 2/2019 | Boysel | G01S 13/865 |
| 2023/0098511 | A1 * | 3/2023 | Dong | G01S 19/393<br>342/357.3 |
| 2023/0194306 | A1 * | 6/2023 | Liu | G01C 21/3837<br>701/412 |
| 2024/0184309 | A1 * | 6/2024 | Cheng | G01S 17/89 |
| 2025/0216525 | A1 * | 7/2025 | Jang | G01S 17/86 |

FOREIGN PATENT DOCUMENTS

| | | | |
|---|---|---|---|
| CN | 110646808 | A | 1/2020 |
| CN | 112394351 | A | 2/2021 |
| CN | 114646299 | A | 6/2022 |
| CN | 114964175 | A | 8/2022 |
| CN | 115493569 | A | 12/2022 |
| CN | 116577802 | A | 8/2023 |
| CN | 117782227 | A | 3/2024 |
| WO | 2020088739 | A1 | 5/2020 |
| WO | 2021208190 | A1 | 10/2021 |
| WO | 2021232470 | A1 | 11/2021 |
| WO | 2022252201 | A1 | 12/2022 |

* cited by examiner

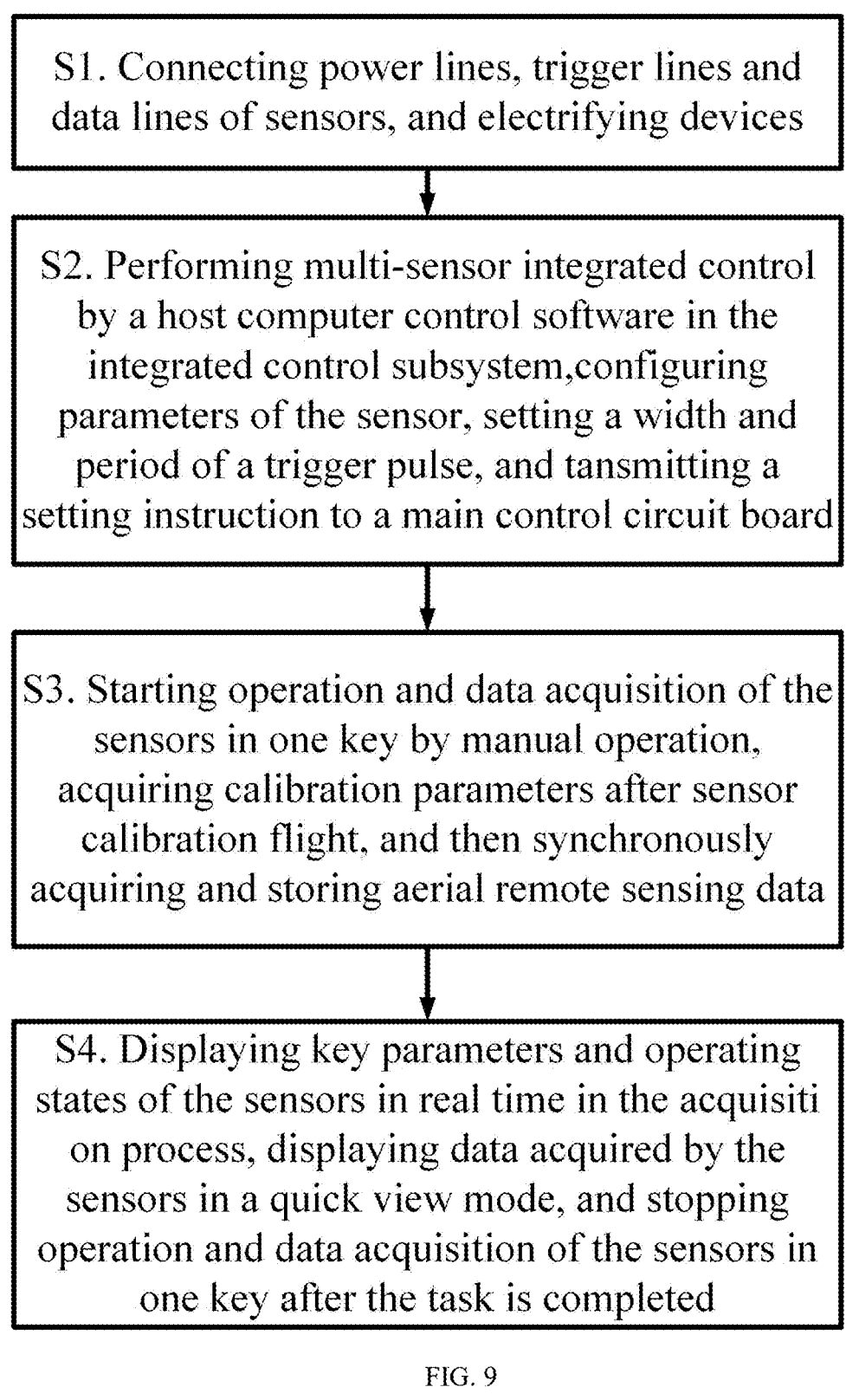

S1. Connecting power lines, trigger lines and data lines of sensors, and electrifying devices S2. Performing multi-sensor integrated control by a host computer control software in the integrated control subsystem,configuring parameters of the sensor, setting a width and period of a trigger pulse, and tansmitting a setting instruction to a main control circuit board S3. Starting operation and data acquisition of the sensors in one key by manual operation, acquiring calibration parameters after sensor calibration flight, and then synchronously acquiring and storing aerial remote sensing data S4. Displaying key parameters and operating states of the sensors in real time in the acquisiti on process, displaying data acquired by the sensors in a quick view mode, and stopping operation and data acquisition of the sensors in one key after the task is completed

FIG. 9

ACQUISITION APPARATUS, ACQUISITION SYSTEM, AND CONTROL METHOD FOR MULTI-SOURCE AERIAL REMOTE SENSING DATA

CROSS REFERENCE TO THE RELATED APPLICATIONS

This application is the continuation application of International Application No. PCT/CN2024/100929, filed on Jun. 24, 2024, which is based upon and claims priority to Chinese Patent Application No. 202410204824.4, filed on Feb. 26, 2024, the entire contents of which are incorporated herein by reference.

TECHNICAL FIELD

The present application relates to the field of aerial survey and remote sensing technology, and more specifically, to an acquisition apparatus, an acquisition system, and a control method for multi-source aerial remote sensing data.

BACKGROUND

Aerial remote sensing is an important means of obtaining surface information and is widely used in land and resources surveys, mapping, national defense and security, emergency rescue and other fields. With the development of aerial remote sensing technology, the application requirements on aerial remote sensing data has gradually extended from single optical images to various types of remote sensing data such as laser point clouds, quantitative spectra, and thermal radiation information. Due to the limitation of a size of a cabin door of a flight platform, a size of a load cabin, a size of an optical window and a load, most current aerial remote sensing platforms may only simultaneously load no more than two remote sensing sensors. Therefore, to obtain the full-factor information such as texture, spectrum, thermal radiation and geometry of a ground target, it is necessary to fly multiple times and carry different types of sensors respectively. However, this method is inefficient and costly due to factors such as airspace and weather, and the aviation platform and atmospheric environment are not as stable as the satellite and space environment. As a result, it is difficult to ensure spatial consistency of remote sensing data obtained from multiple flights, which often makes it impossible to integrate and use various types of remote sensing data.

With the development of aircraft, sensors, image processing and other technologies, the integration of various types of sensors on the same platform has become a development trend of aerial remote sensing. In recent years, domestic and foreign manufacturers have integrated a plurality of sets of multi-source remote sensing systems; however, these systems all have problems such as poor multi-sensor integration, poor flight platform adaptability, low payload synchronization control accuracy, difficulty in data synchronization collection and difficulty in data fusion, which seriously affects the efficiency and quality of data acquisition and greatly increases the cost of use.

Therefore, it is a problem required to be solved urgently by those skilled in the art to provide an acquisition apparatus, an acquisition system, and a control method for multi-source aerial remote sensing data to solve the difficulties in the prior art.

SUMMARY

In view of this, the present application provides an acquisition apparatus, an acquisition system, and a control method for multi-source aerial remote sensing data, wherein a laser radar, a hyperspectral camera, a thermal infrared camera and a visible light camera are integrated by using a single set of attitude and position measurement unit (POS system) in an ultra-compact manner, and comprehensive and synchronous acquisition of texture, spectrum, temperature and geometric information with temporal and spatial consistency is achieved based on an integrated control system, so that the problems of consistency of multi-sensor observation targets, stability of geometric relationships and convenience in use may be solved.

To achieve the above objective, the present application provides the following technical solutions.

A multi-source aerial remote sensing data acquisition apparatus includes a flight platform and onboard equipment arranged on the flight platform;

- the onboard equipment includes: a multi-sensor ultra-compact integrated device, an onboard integrated synchronization control device, and a global navigation satellite system (GNSS) receiving antenna; the multi-sensor ultra-compact integrated device is connected to the onboard integrated synchronization control device via a cable, and the GNSS receiving antenna is arranged on an upper end face of the flight platform;
- the multi-sensor ultra-compact integrated device is configured to acquire multi-source remote sensing data;
- the onboard integrated synchronization control device is configured to control the operation of the multi-sensor ultra-compact integrated device;
- the GNSS receiving antenna is configured to convert radio signals transmitted by satellites into electrical current for use by receiver electronics;
- the multi-sensor ultra-compact integrated device includes: a laser radar, a hyperspectral camera, a visible light camera, a thermal infrared camera, an inertial measurement unit IMU, and a reference mounting plate;
- the reference mounting plate is provided with mounting reference edges of sensors and is configured to provide a mounting reference structure for a plurality of types of sensors; reference axes of the sensors and the inertial measurement unit (IMU) are orthogonally aligned;

The laser radar, the visible light camera and the thermal infrared camera are all mounted at a lower end of the reference mounting plate; the laser radar is configured to acquire laser point cloud data of a ground target; the visible light camera is configured to acquire an optical image of a ground target; the thermal infrared camera is configured to acquire a thermal infrared image of a ground target;

- the hyperspectral camera and the inertial measurement unit IMU are mounted at an upper end of the reference mounting plate; the hyperspectral camera is configured to acquire quantitative spectral data of a ground target; the inertial measurement unit IMU is configured to provide position and attitude information for the laser radar, the hyperspectral camera, the visible light camera and the thermal infrared camera and acquire aerial remote sensing data with geographic information; and
- the multi-sensor ultra-compact integrated device is formed by rigidly connecting and combining a plurality of types of remote sensing sensors through the reference mounting plate by adopting an upper and lower layered structure.

Optionally, the reference mounting plate is further provided with a tail support, a bottom mounting frame, a top mounting frame and a plurality of shock absorbers;

the tail support is arranged on a lower end face of the reference mounting plate and is fixed on one side of the laser radar by bolts;

the bottom mounting frame is arranged on a lower end face of the reference mounting plate and is fixed to one side of the laser radar corresponding to the tail support by bolts, and the visible light camera and the thermal infrared camera are fixedly connected to the bottom mounting frame by bolts;

the top mounting frame is arranged on an upper end face of the reference mounting plate and is fixedly connected to the hyperspectral camera by bolts; and a plurality of the shock absorbers are provided, arranged at a lower end of the reference mounting plate, positioned at four corners of the reference mounting plate, and fixedly connected to the reference mounting plate by bolts, and the shock absorbers are configured to reduce the impact of platform vibration on sensors during flight.

Optionally, the onboard integrated synchronization control device includes: an industrial control host, an integrated power supply and distribution module, an integrated navigation host, a telescopic control console, a display, an aviation shock absorption cabinet, and a data storage unit;

the aviation shock absorption cabinet is configured to integrate the industrial control host, the integrated power supply and distribution module, the integrated navigation host, the telescopic control console, the display and the data storage unit;

the industrial control host, the integrated power supply and distribution module and the data storage unit are all arranged inside the aviation shock absorption cabinet and are fixedly connected to the aviation shock absorption cabinet by bolts; the industrial control host is configured to send instructions to functional modules, control power-on, acquisition, and storage working states of the sensors, and set working parameters of the sensors; the integrated power supply and distribution module is configured to convert a power supply voltage of the flight platform to meet power consumption requirements of the sensors; the data storage unit is configured to store laser point clouds, hyperspectral images, thermal infrared images and visible light image generated in the data acquisition process;

one end of the telescopic control console is embedded in one side of the aviation shock absorption cabinet far away from the data storage unit, another side of the telescopic control console extends out of the aviation shock absorption cabinet, and the telescopic control console is configured to manually operate the industrial control host;

the integrated navigation host is arranged on the aviation shock absorption cabinet, positioned at the same side as the telescopic control console, and fixedly connected to the aviation shock absorption cabinet by bolts, and the integrated navigation host is configured to receive and fuse measurement data from a global navigation satellite system and the inertial measurement unit IMU to obtain a three-dimensional position, a velocity and an attitude; and the display is arranged on the aviation shock absorption cabinet, positioned at the same side as the telescopic control console and positioned above the telescopic control console; and the display is fixedly connected to the aviation shock absorption cabinet by bolts and configured to display working parameters of the devices and display working state and data acquisition quality of the sensors in real time during working.

A multi-source aerial remote sensing data acquisition system includes the multi-source aerial remote sensing data acquisition apparatus according to any one of the above aspects, and further includes: a power supply and distribution subsystem, an integrated control subsystem, a high-capacity data high-speed storage subsystem and a real-time display and monitoring subsystem;

the power supply and distribution subsystem is configured to distribute power supplies meeting voltage and power requirements to sensors and other electrical devices;

the integrated control subsystem is configured to send a control instruction, centrally control a plurality of sensors to perform data acquisition, storage and display operations, and achieve time synchronization of the sensors;

the high-capacity data high-speed storage subsystem is configured to meet storage requirements of large data volumes and high data rates of the plurality of sensors; and the real-time display and monitoring subsystem is configured to display data condition acquired by the sensors in real time in an operation process and monitor working state parameters of the sensors.

Optionally, the power supply and distribution subsystem includes an isolated direct current/direct current (DC/DC) module and a rack-mounted inverter;

the isolated DC/DC module is configured to perform voltage conversion on a direct-current power supply provided by the flight platform;

the rack-mounted inverter is configured to convert direct current into alternating current and convert direct current voltage input by the isolated DC/DC module into alternating current voltage;

the integrated control subsystem comprises a time synchronization module and a multi-sensor synchronization control module; wherein the time synchronization module comprises a high-precision time unit and a sensor timing unit and is configured to establish a high-precision time reference; and the multi-sensor synchronization control module is configured to comprehensively control a plurality of sensors for data acquisition, storage and display operations.

Optionally, the high-capacity data high-speed storage subsystem includes an Oculink connector and a disk array and is configured to store data acquired by a plurality of sensors on board in real time;

the Oculink connector is configured to connect the disk array to the integrated control subsystem for Peripheral Component Interconnect Express 4.0 (PCIE4.0) connection between the disk array and the integrated control subsystem;

the disk array is composed of a first solid state disk, a second solid state disk and a third solid state disk, the first solid state disk is configured to store laser point cloud data and thermal infrared image data, the second solid state disk is configured to store visible light image data, and the third solid state disk is configured to store hyperspectral image data and attitude position measurement data;

the real-time display and monitoring subsystem comprises a data analysis module and a data quick-view module;

the data analysis module is configured to analyze a plurality of types of data and perform quick image preprocessing; and the data quick-view module is configured to display generated graphs in different quick-view modes such as scrolling, refreshing and changing scene.

A multi-source aerial remote sensing data acquisition control method is applied to the multi-source aerial remote sensing data acquisition system according to any one of the above aspects, and includes the following steps:

S1: connecting power lines, trigger lines and data lines of sensors, and electrifying devices;

S2: performing multi-sensor integrated control by a host computer control software in the integrated control subsystem, configuring parameters of the sensor, setting a width and period of a trigger pulse, and transmitting a setting instruction to a main control circuit board;

S3: starting operation and data acquisition of the sensors in one key by manual operation, acquiring calibration parameters after sensor calibration flight, and then synchronously acquiring and storing aerial remote sensing data; and

S4: displaying key parameters and operating states of the sensors in real time in the acquisition process, displaying data acquired by the sensors in a quick view mode, and stopping operation and data acquisition of the sensors in one key after the task is completed.

Optionally, the sensor calibration in S3 is specifically as follows:

S31: selecting and laying out a calibration site, wherein the calibration site is provided with buildings for laser radar calibration, and ground objects have reflectivity;

S32: setting up a calibration route, and uniformly distributing a plurality of control points along a route direction by adopting a vertical crossing and large lateral overlapping laying method;

S33: flying according to the set calibration route, and acquiring laser radar point cloud data;

S34: automatically extracting a connecting surface between overlapping flight strips, and acquiring barycentric coordinates ($X_{84}$, $Y_{84}$, $Z_{84}$) of the connecting surface;

S35: taking the barycentric coordinates as connection points of different flight strips, and then establishing an error equation according to a difference between the barycentric coordinates of the connecting surface and an observation equation of laser foot points; and

S36: setting N connection points, establishing N error equations, and solving an error of an installation angle by applying a least square principle.

Optionally, the step of synchronously acquiring and storing aerial remote sensing data in S3 is specifically as follows:

S331: establishing a time reference based on GNSS information and a differential crystal oscillator provided by the integrated navigation host;

S332: calibrating measurement time of the inertial measurement unit IMU by using 1 pulse per second (1PPS) signal sent by the integrated navigation host;

S333: reducing GNSS observation data delay and data update calculation delay of the inertial measurement unit IMU by using an improved Kalman filtering algorithm; and

S334: performing timing on the laser radar, the hyperspectral camera, the visible light camera and the thermal infrared camera by using the sensor timing unit, and completing synchronous acquisition of multi-source aerial remote sensing data.

Optionally, S333 is specifically as follows:

step I: when the integrated navigation host starts to sample GNSS signals, saving output values of an IMU accelerometer and a gyroscope, and when GNSS observation data are actually received, starting calculating and updating an attitude, a velocity and a position of the current flight platform in real time;

firstly, performing attitude solution by using an attitude differential equation:

$$\dot{C}_b^i = C_b^i(\omega_{ib}^b \times) \text{ and } \dot{C}_i^n = (\omega_{ni}^n \times)C_i^n = (-\omega_{in}^n \times)C_i^n,$$

and updating an attitude matrix from a moment $t_{k-1}$ to a moment $t_k$ by adopting a formula:

$$C_{b(k)}^i = C_{b(k-1)}^i C_{b(k)}^{b(k-1)},\ C_i^{n(k)} = C_{n(k-1)}^{n(k)} C_i^{n(k-1)};$$

b represents a flight platform coordinate system, i represents an inertial coordinate system, n represents a navigation coordinate system, a matrix $$C_b^i$$

is an attitude relationship of b system relative to i system expressed by quaternion, $$\dot{C}_b^i$$

represents a differential of $$C_b^i$$

relative to time, $$\dot{C}_i^n$$

represents a differential of $$C_i^n$$

with respect to time, $$\omega_{ni}^n$$

represents a projection of an angular velocity of i system relative to n system in n system, $$\omega_{in}^{n}$$

represents a projection of an angular velocity of n system relative to i system in n system, $$C_i^n$$

represents an attitude conversion matrix from the inertial coordinate system to the navigation coordinate system, $$\omega_{ib}^{b}$$

represents direct output of the IMU, which is a projection of an angular velocity of b system relative to i system in b system, $$C_{b(k)}^{b(k-1)}$$

represents a rotation change of b system from moment $t_{k-1}$ to moment $t_k$ when i system is used as a reference, which is determined by $$\omega_{ib}^{b}, C_{b(k)}^{i}$$

represents an attitude conversion matrix from the flight platform coordinate system to the inertial coordinate system at a moment $t_k$, $$C_{b(k-1)}^{i}$$

represents an attitude conversion matrix from the flight platform coordinate system to the inertial coordinate system at a moment $t_{k-1}$, $$C_i^{n(k)}$$

represents an attitude conversion matrix from the inertial coordinate system to the navigation coordinate system at a moment $t_k$, $$C_{n(k-1)}^{n(k)}$$

represents a rotation change of n system from moment $t_{k-1}$ to moment $t_k$, and $$C_i^{n(k-1)}$$

represents an aunque conversion matrix from the inertial coordinate system to the navigation coordinate system at a moment $t_{k-1}$;

then updating velocity state by using a velocity differential equation and performing integration to obtain:

$$V_k^{n(k)} = V_{k-1}^{n(k-1)} + \Delta V_{sf(k)}^{n} + \Delta V_{cor/g(k)}^{n},$$

$$V_{k-1}^{n(k-1)}$$

is a velocity at a moment $t_{k-1}$, $$\Delta V_{sf(k)}^{n}$$

is velocity increment of an n-system specific force, $$\Delta V_{cor/g(k)}^{n}$$

is velocity increment of a harmful acceleration, $$V_k^{n(k)}$$

is a velocity at a moment $t_k$;

finally, performing position update calculation by using a position differential equation:

$$P_k = P_{k-1} + M_{k-\frac{1}{2}}(V_{k-1}^{n} + V_k^{n})\frac{\Delta T}{2},$$

$P_k$ is a position state matrix at a moment $t_k$, $$V_k^n$$

is a velocity value output by IMU at a moment $t_k$, $$M_{k-\frac{1}{2}}$$

is a conversion matrix, $P_{k-1}$ is a position state matrix at a moment $t_{k-1}$, $$V_{k-1}^{n}$$

is a velocity value output at a moment $t_{k-1}$, and $\Delta T$ is time increment;

step II: firstly, calculating a state parameter estimator and a state parameter covariance estimator at the GNSS sampling, i.e., a moment $t_k$, then transferring the state parameter estimator and the state parameter covariance estimator to a current moment, that is, completing calculation update at a moment $t_j$, j>k, performing state transfer by the following formula, and correcting a delay error of the current moment:

$$\hat{X}_{j,k}^{-} = \Phi_{j/k}\hat{X}_k^{+},\ P_{j,k}^{-} = \Phi_{j/k}P_k^{+}\Phi_{j,k}^{T} + M_{j,k+1}$$

$$\hat{X}_{j,k}^{-}$$

is a linear minimum variance estimate of a state parameter vector $X_j$ at a moment $t_j$ made by k observation vector values at moment $t_k$ to $t_j$, $\Phi_{j/k}$ is a state transfer matrix, $$\hat{X}_k^{+}$$

is an updated estimate of the state parameter vector $X_k$ at a moment $t_k$, $$P_{j,k}^{-}$$

is a covariance matrix of a prediction error, $$P_k^{+}$$

is a covariance matrix of a state parameter, $$\Phi_{j,k}^{T}$$

is a transpose of a state transfer matrix, and $M_{j,k+1}$ is a correction matrix factor.

It can be known from the technical solutions that, compared with the prior art, the present invention provides an acquisition apparatus, an acquisition system, and a control method for multi-source aerial remote sensing data, which have the following beneficial effects:

According to structural design and system development, the laser radar, the hyperspectral camera, the thermal infrared camera and the visible light camera are integrated in an ultra-compact manner by a set of high-precision inertial navigation system, the efficient and synchronous acquisition of texture, spectrum, temperature and geometric information is achieved by using the integrated control subsystem, the multi-source data is ensured to have temporal and spatial consistency by the provided control method, the absolute positioning precision of the data and the mutual registration precision of the multi-source data are significantly improved, the combined processing and fusion application requirements of the multi-source remote sensing data may be met, and the amount of effective information obtained in a single flight is greatly increased.

BRIEF DESCRIPTION OF THE DRAWINGS

To more clearly illustrate the technical solutions in the embodiments of the present application or in the prior art, the drawings required to be used in the description of the embodiments or the prior art are briefly introduced below. It is obvious that the drawings in the description below are merely embodiments of the present application, and those of ordinary skill in the art can obtain other drawings according to the drawings provided without creative efforts.

FIG. 9 is a flowchart of a multi-source aerial remote sensing data acquisition control method according to the present application.

Figure 1:
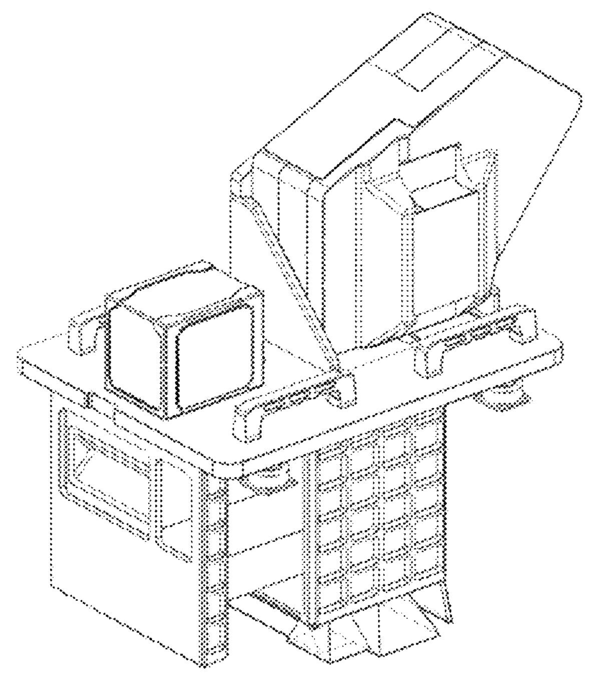
FIG. 1 is a schematic diagram of a three-dimensional structure of a multi-sensor ultra-compact integrated device according to the present application.

Reference numerals: 1: laser radar, 2: hyperspectral camera, 3: visible light camera, 4: thermal infrared camera, 5: inertial measurement unit IMU, 6: reference mounting plate, 7: tail support, 8: bottom mounting frame, 9: top mounting frame, 10: shock absorber, 11: mounting handle, 12: threaded hole, 13: heightening pad, 14: cabin floor, 15: mounting adapter plate, 16: aerial measurement window, 17: industrial control host, 18: integrated power supply and distribution module, 19: integrated navigation host, 20: telescopic control console, 21: display, 22: aviation shock absorption cabinet, and 23: data storage unit.

DETAILED DESCRIPTION OF THE EMBODIMENTS

The following clearly and completely describes the technical solutions in the embodiments of the present application with reference to drawings in the embodiments of the present application. It is clear that the described embodiments are merely a part rather than all of the embodiments of the present application. Based on the examples of the present application, all other examples obtained by those of ordinary skill in the art without creative efforts shall fall within the protection scope of the present application.

The present application discloses a multi-source aerial remote sensing data acquisition apparatus, which includes: a flight platform, wherein the flight platform is a common model of fixed-wing manned aircraft, and the belly of the cabin is provided with an aerial survey window 16 with a radius of not less than 450 mm, and the models include but are not limited to Yun-5, Yun-12, Big Brown Bear, Cessna 208, King Air 350; and onboard equipment arranged on the flight platform, wherein the onboard equipment includes a multi-sensor ultra-compact integrated device, an onboard integrated synchronization control device, and a GNSS receiving antenna; the multi-sensor ultra-compact integrated device is connected to the onboard integrated synchronization control device via a cable, and the GNSS receiving antenna is arranged on an upper end face of the flight platform; the multi-sensor ultra-compact integrated device is configured to acquire multi-source remote sensing data; the onboard integrated synchronization control device is configured to control the operation of the multi-sensor ultra-compact integrated device; and the GNSS receiving antenna is configured to convert radio signals transmitted by satellites into electrical current for use by receiver electronics.

Figure 2:
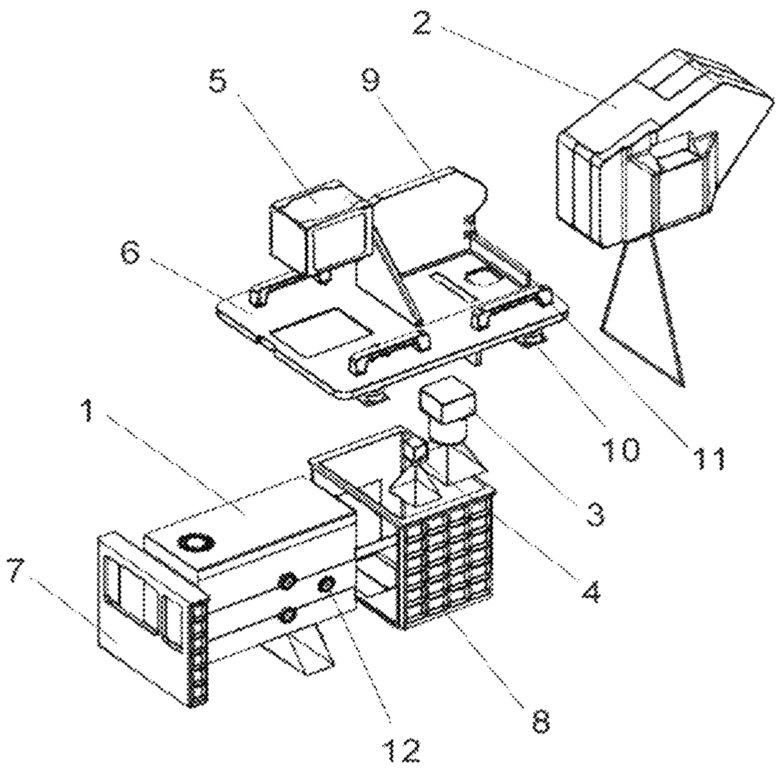
FIG. 2 is a schematic diagram of a split structure of a multi-sensor ultra-compact integrated device according to the present application.

The multi-sensor ultra-compact integrated device, as shown in FIG. 1 and FIG. 2, is composed of a reference mounting plate 6, a laser radar 1, a hyperspectral camera 2, a visible light camera 3, a thermal infrared camera 4, an inertial measurement unit IMU 5, a plurality of shock absorbers 10, a tail support 7, a bottom mounting frame 8, and a top mounting frame 9, and is configured to acquire multi-source remote sensing data.

Further, since the sizes of a plurality of types of sensors are relatively large, parallel distribution causes the horizontal size of the entire device to be too large, and it is impossible to adapt to a plurality of flight platforms at the same time; the multi-sensor ultra-compact integrated device adopts an upper and lower layered structure, and a plurality of types of sensors are combined by rigid connection of the reference mounting plate 6.

Since the field of view of hyperspectral camera 2 is small and linear, and the field of view of laser radar 1, visible light camera 3 and thermal infrared camera 4 is large, the laser radar 1; the visible light camera 3 and the thermal infrared camera 4 are arranged in a lower layer closer to an optical window, and the hyperspectral camera 2 and the inertial measurement unit IMU5 without field of view requirements are arranged in an upper layer. This arrangement may minimize the size requirement of the flight platform observation window of the entire system and increase the platform adaptability of the system.

The reference mounting plate 6 is made of light steel material with high rigidity and has an outer contour size of 560 mm×550 mm (length×width). The reference mounting plate is provided with the mounting reference edges of the sensors and is configured to provide a stable and reliable mounting reference structure for a plurality of types of sensors. Therefore, the observation fields of the sensors are matched and correspond, the reference axis systems of the sensors and the inertial measurement unit IMU 5 are orthogonally aligned, and the placement relationship between the sensors is stable and unchanged, which provides a good hardware foundation for ensuring the spatial consistency of multi-source remote sensing data.

The laser radar 1 is an onboard long-range laser scanner with a field of view of 60°, a laser emission frequency of 2000 KHz and a parallel line scanning method. The laser radar may emit 45 pulses simultaneously in the air, can record more than 14 echoes, and has 3900 m@20% reflectivity and 5800 m@60% reflectivity relative to the maximum flight operating altitude. The laser radar has full waveform digital multi-echo processing capabilities and is configured to acquire laser point cloud data of a ground target. The laser radar is arranged on a lower end face of the reference mounting plate 6. The tail support 7 is fixed to one side of the laser radar 1 by bolts using threaded holes 12 on two sides and the tail. The bottom mounting frame 8 is fixed to a corresponding side of the laser radar 1 and the tail support 7 by bolts. The bottom mounting frame 8 and the tail support 7 are fixedly connected to the reference mounting plate 6 by bolts.

The hyperspectral camera 2 is an onboard full-spectrum hyperspectral system with a spectrum detection range of 380 nm-2500 nm, a field of view of 32.3°, scanning line pixels of 384 and a spectral resolution of 3.5 nm/10 nm, and is configured to acquire quantitative spectrum data of a ground target. The hyperspectral camera is mounted on an upper end face of the reference mounting plate 6 and is mounted on the top mounting frame 9 using threaded holes 12 at sides. The top mounting frame 9 and the reference mounting plate 6 are fixedly connected by bolts. Both the top mounting frame 9 and the reference mounting plate 6 are provided with observation slits to ensure the passability of the field of view of the hyperspectral camera 2.

The visible light camera 3 is a medium-format optical aerial survey camera with a field of view of 30°, an effective pixel count of 11664×8750 and a format size of 33 mm×44 mm. The visible light camera is arranged on the lower end face of the reference mounting plate 6 and is fixedly connected to the bottom mounting frame 8 by bolts to acquire high-definition optical images of a ground target.

The thermal infrared camera 4 is a broadband uncooled infrared thermal imager with a field of view of 45°×37°, effective pixels of 640×512, a working spectrum wavelength range of 7 μm-14 μm, an equivalent measurement precision of NEdT≤45 mK (30° C.), an absolute temperature precision of 1 K or 1%, and a temperature measurement range of −20° C.-150° C. The thermal infrared camera is arranged on a lower end face of the reference mounting plate 6, placed side by side with the visible light camera 3, and fixedly connected to the bottom mounting frame 8 by bolts, so as to acquire thermal infrared images of a ground target;

The inertial measurement unit IMU 5 is an ultra-high-performance metrology-grade fiber-optic integrated navigation system with a positioning precision of ≤1 cm, a velocity error of ≤0.005 m/s, a roll/pitch angle of ≤0.003°, an inertial measurement unit IMU 5 data recording frequency of >200 Hz and a post-processing heading precision of 0.004°. The inertial measurement unit IMU is directly mounted on an upper end face of the reference mounting plate 6 by bottom threaded hole 12, fixedly connected to the reference mounting plate 6 by bolts, and configured to provide accurate position and attitude information for the laser radar 1, the hyperspectral camera 2, the visible light camera 3 and the thermal infrared camera 4, and assists in the acquisition of high-precision aerial remote sensing data with geographic information.

The shock absorbers 10 are four T44 damping isolators with comprehensive shock absorption function, which may well isolate vibrations and disturbances in all directions and frequencies and withstand a load weight of more than 70 kg. The shock absorbers are mounted on a lower end face of the reference mounting plate 6, respectively positioned at four corners of a rectangular base plate, and fixedly connected to the reference mounting plate 6 by bolts, so as to reduce the influence of platform vibration on the sensors during flight.

Figure 3:
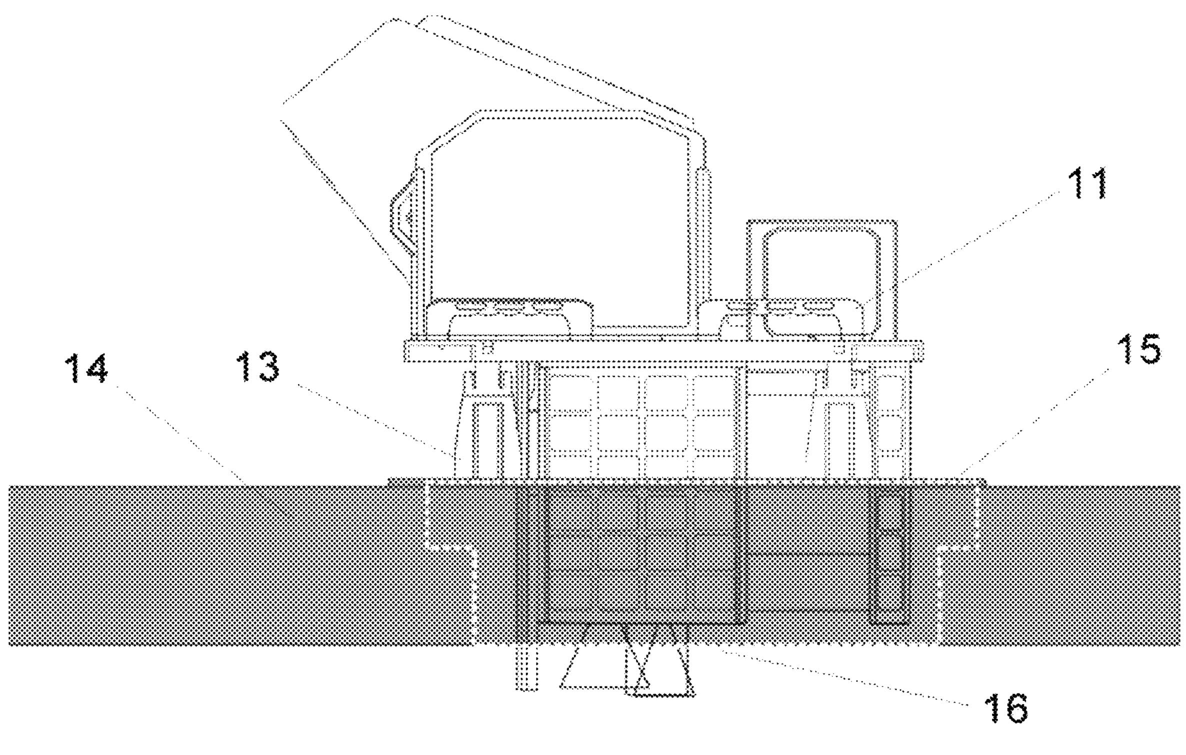
FIG. 3 is a side view of the installation of a multi-sensor ultra-compact integrated device according to the present application.

The multi-sensor ultra-compact integrated device is mounted in the aerial survey window 16 by a sinking mounting manner, as shown in FIG. 3. A lower sensor has an outer contour size of 450 mm×341 mm (length×width). The device sinks the lower sensor below the cabin floor 14 by adding a customized heightening pad 13 to the shock absorber 10 at the bottom of the reference mounting plate 6. The heightening pad 13 is connected to the shock absorber 10 by bolts. The heightening pad 13 is supported on the mounting adapter plate 15 and fixed by bolts. The mounting adapter plate 15 is attached to the cabin floor 14 and fixed to the cabin floor 14 by aircraft-specific bolts.

Further, the heightening pad 13 is made of 6061 aluminum alloy. Four M5 shock absorber mounting threaded holes are reserved on a top, four M6 adapter plate mounting threaded holes are reserved on a bottom, and a weight-reducing groove is provided in the middle, which may bear a load weight of more than 100 kg.

Figure 4:
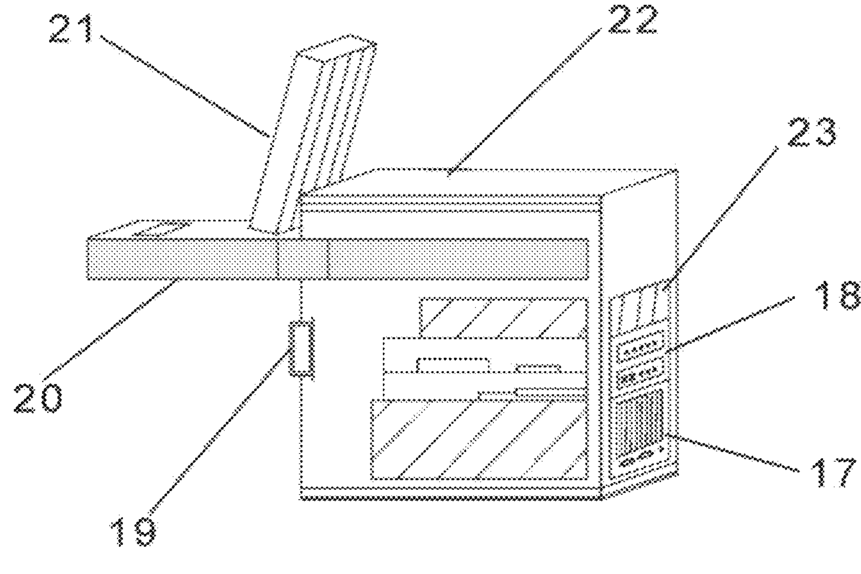
FIG. 4 is a schematic diagram of a composition structure of an onboard integrated synchronization control device according to the present application.

The onboard integrated synchronization control device, as shown in FIG. 4, is composed of the aviation shock absorption cabinet 22, the industrial control host 17, the integrated power supply and distribution module 18, the integrated navigation host 19, the telescopic control console 20, the display 21 and the data storage unit 23, is connected to the multi-sensor ultra-compact integrated device by cables, and is fixed on a cabin floor 14 by foundation bolts.

The aviation shock absorption cabinet 22 is made of a 2 mm aluminum plate, is subjected to sandblasting black oxidation treatment, and is configured to integrate the industrial control host 17, the integrated power supply and distribution module 18, the integrated navigation host 19, the telescopic control console 20, the display 21 and the data storage unit 23.

The industrial control host 17 is mounted inside the aviation shock absorption cabinet 22, is fixedly connected to the aviation shock absorption cabinet 22 by bolts, and is configured to send instructions to functional modules, control power-on, acquisition, and storage working states of the sensors and set working parameters of the sensors.

The integrated power supply and distribution module 18 is mounted inside the aviation shock absorption cabinet 22, is fixedly connected to the aviation shock absorption cabinet 22 by bolts, and is configured to convert a power supply voltage of the flight platform to meet power consumption requirements of the sensors.

The integrated navigation host 19 is arranged on the aviation shock absorption cabinet 22, is positioned at the same side as the telescopic control console 20, and is fixedly connected to the aviation shock absorption cabinet 22 by bolts, and the integrated navigation host 19 is configured to receive and fuse measurement data from a global navigation satellite system and the inertial measurement unit IMU 5 to obtain a three-dimensional position, a velocity and an attitude.

One end of the telescopic control console 20 is embedded in one side of the aviation shock absorption cabinet 22 far away from the data storage unit 23, another side of the telescopic control console 20 extends out of the aviation shock absorption cabinet 22, and the telescopic control console 20 is configured to manually operate the industrial control host 17.

The display 21 in a dual-screen foldable form is arranged on the aviation shock absorption cabinet 22, is positioned at the same side as the telescopic control console 20 and is positioned above the telescopic control console 20; and the display 21 is fixedly connected to the aviation shock absorption cabinet 22 by bolts and configured to display working parameters of the devices and display working state and data acquisition quality of the sensors in real time during working.

The data storage unit 23 is mounted inside the aviation shock absorption cabinet 22 and is composed of an SSD solid state disk array in a drawing mode, and the drawing box may be used in a plug-and-play mode. A adjustable lock design mode is adopted, so that the M.2 hard disk fixer may slide freely. Meanwhile, the drawer is fixed on the aviation shock absorption cabinet 22 by a key ring and is configured to store laser point clouds, hyperspectral images, thermal infrared images and visible optical image data generated in the data acquisition process.

Figure 5:
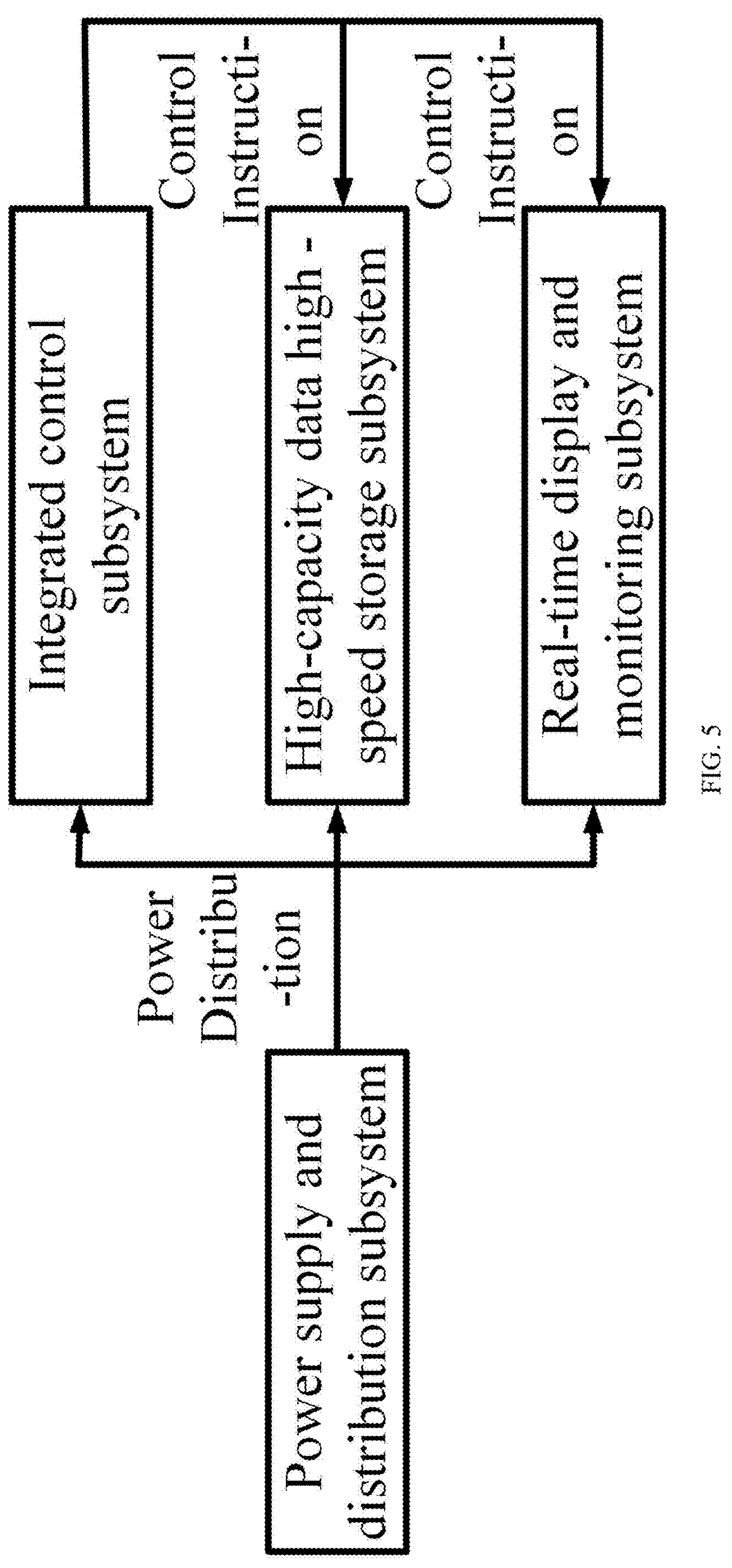
FIG. 5 is a schematic diagram of the composition of a multi-source aerial remote sensing data acquisition system according to the present application.

A multi-source aerial remote sensing data acquisition system, as shown in FIG. 5, includes a power supply and distribution subsystem, an integrated control subsystem, a high-capacity data high-speed storage subsystem and a real-time display and monitoring subsystem.

Figure 6:
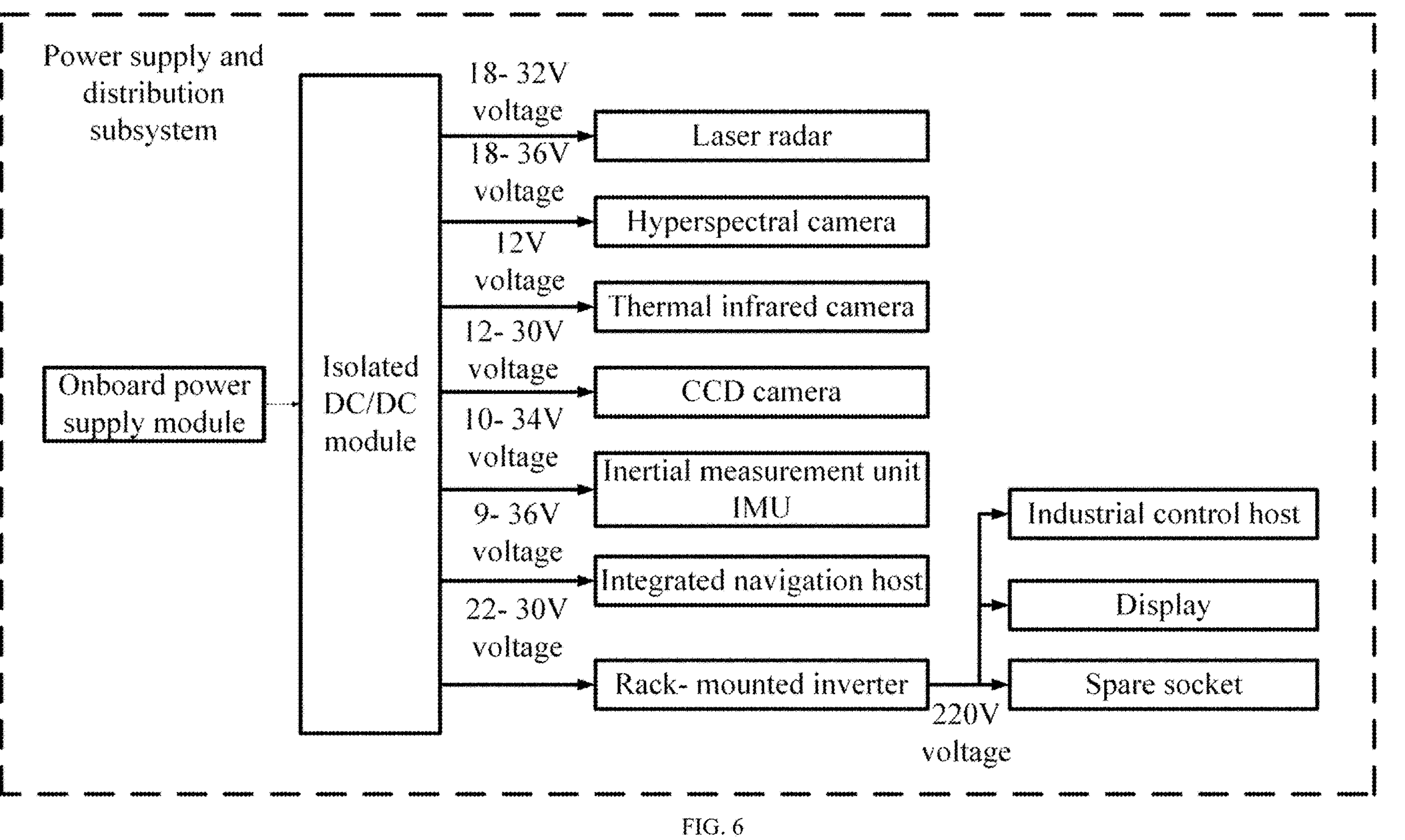
FIG. 6 is a schematic diagram of the composition of a power supply and distribution subsystem according to the present application.

The power supply and distribution subsystem is configured to distribute power supplies meeting voltage and power requirements to sensors and other electrical devices, as shown in FIG. 6, which mainly includes an isolated DC/DC module and a rack-mounted inverter. The isolated DC/DC module is configured to perform voltage conversion on a direct-current power supply provided by the flight platform, and provide direct current meeting corresponding voltage requirements for the laser radar 1, the hyperspectral camera 2, the visible light camera 3, the thermal infrared camera 4, the inertial measurement unit IMU 5 and the integrated navigation host 19. The rack-mounted inverter is configured to convert direct current into alternating current and convert direct current voltage input by the isolated DC/DC module into alternating current voltage, and further supply power to the industrial control host 17, the display 21 and a spare socket.

Figure 7:
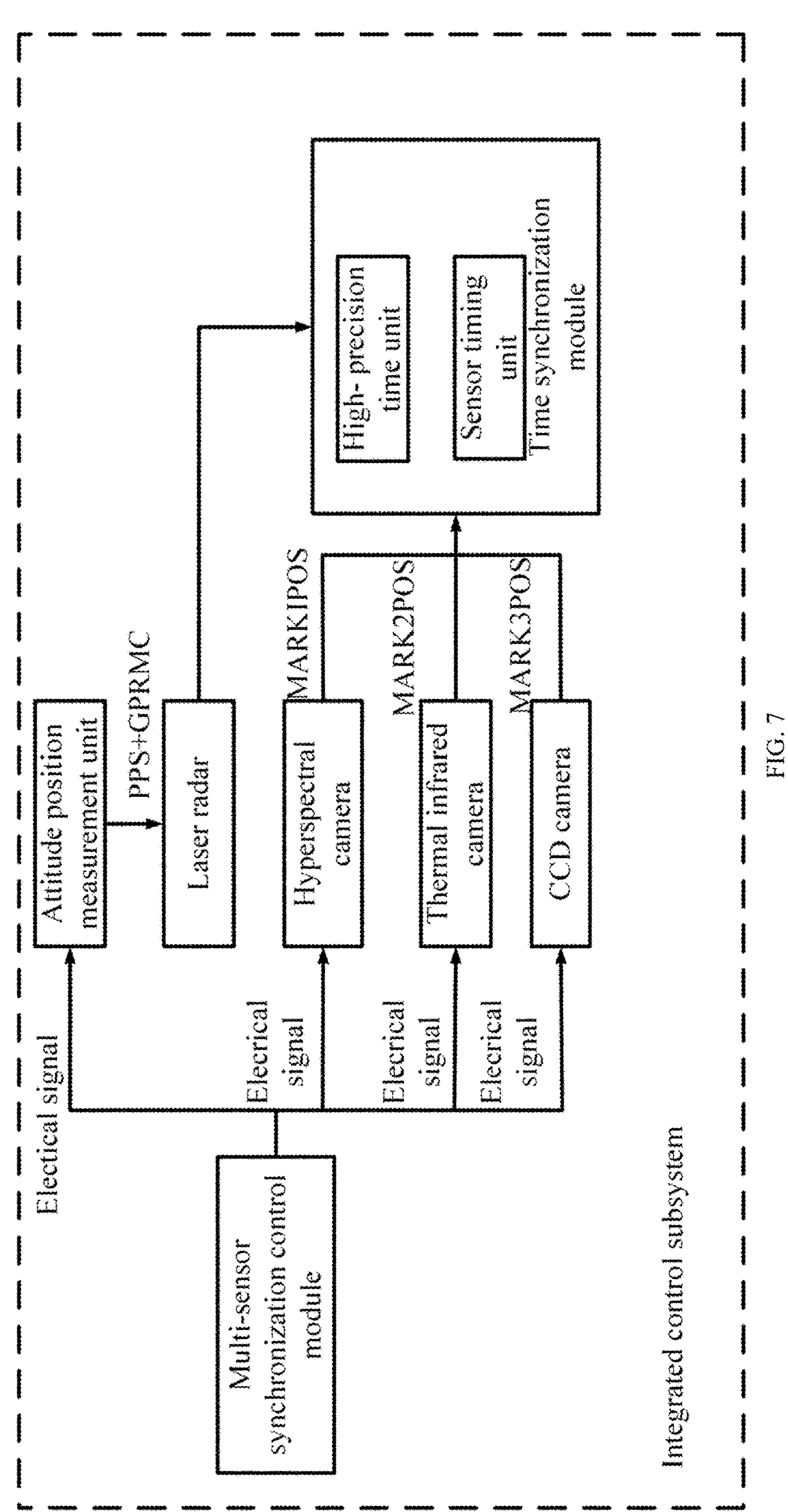
FIG. 7 is a schematic diagram of the composition of an integrated control subsystem according to the present application.

The integrated control subsystem is configured to send an instruction, centrally control a plurality of sensors to perform data acquisition, storage and display operations and achieve the accurate synchronization of the time of the sensors, as shown in FIG. 7, which includes a time synchronization module and a multi-sensor synchronization control module. The time synchronization module includes a high-precision time unit and a sensor timing unit, and is configured to provide high-precision standard time and ensure that the clocks of the sensors can be synchronized with the high-precision time unit. The laser radar 1 receives PPS pulse signals and GPRMC time synchronization messages of the attitude position measurement unit, calculates trigger acquisition time and synchronizes the time to the system time of the device by the sensor timing unit. When the hyperspectral camera 2, the visible light camera 3 and the thermal infrared camera 4 receive the control command to trigger photographing, the system records the mark information (including time and position) of the attitude position measurement unit, and achieves temporal and spatial consistency matching with other types of sensors based on this mark information. The multi-sensor synchronization control module is configured to comprehensively control a plurality of sensors for data acquisition, storage and display operations, trigger control instructions on the hyperspectral camera 2, the visible light camera 3, the thermal infrared camera 4 and the attitude position measurement unit by electric signals, trigger control instructions on the laser radar 1 by PPS signals, and achieve integrated synchronization control of the sensors depending on the time synchronization module.

Figure 8:
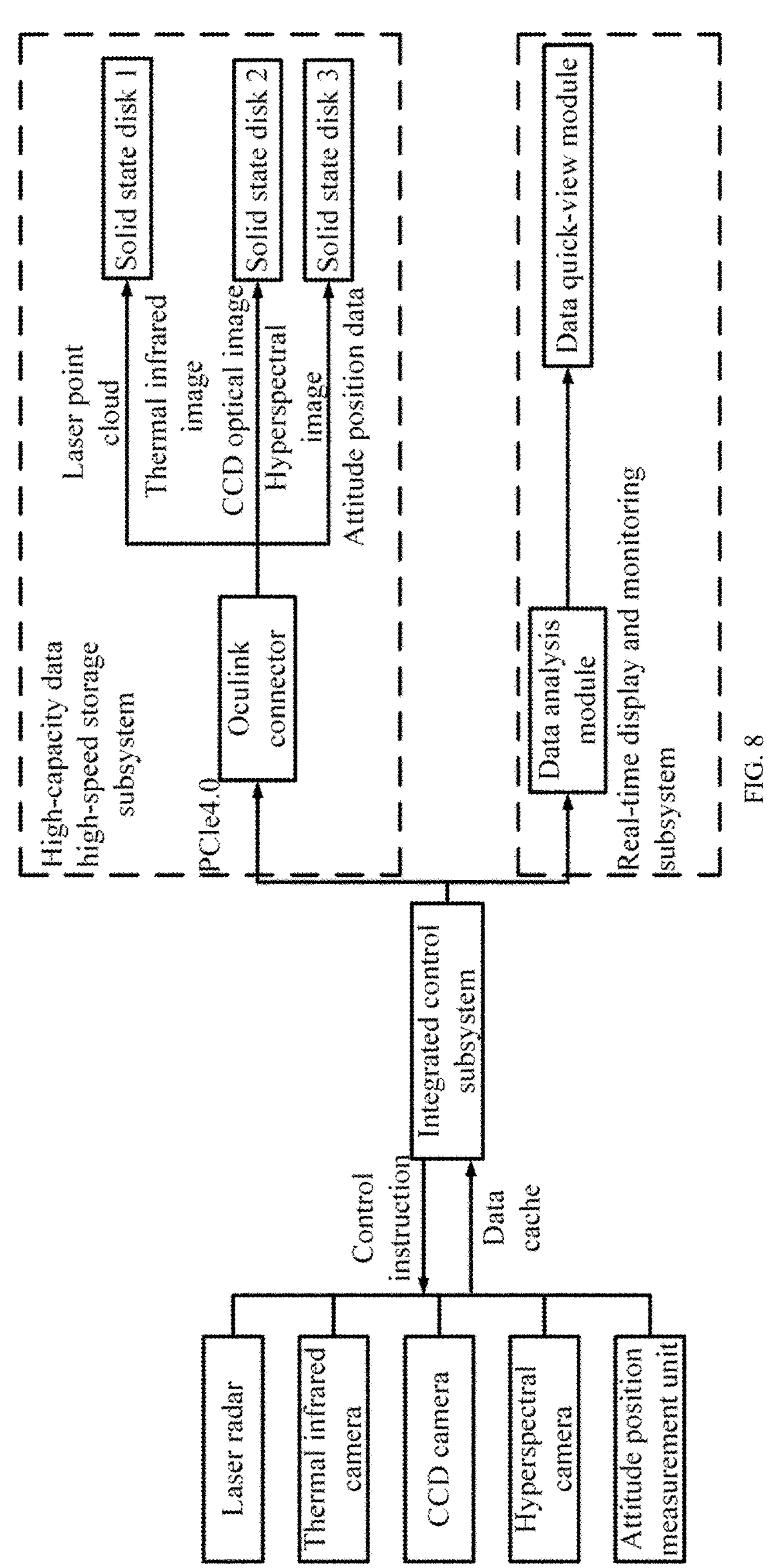
FIG. 8 is a schematic diagram of the composition of a high-capacity data high-speed storage subsystem and a real-time display and monitoring subsystem according to the present application.

The high-capacity data high-speed storage subsystem is configured to meet storage requirements of large data volumes and high data rates of the plurality of sensors, as shown in FIG. 8, which mainly includes an Oculink connector and a disk array, and is mainly configured to store mass data acquired by a plurality of sensors on board in real time. The Oculink connector is configured to connect the disk array to the integrated control subsystem for PCIE4.0 connection between the disk array and the integrated control subsystem to meet the high-speed access requirement of data. The disk array is composed of a first solid state disk, a second solid state disk and a third solid state disk, and the designed storage capacity is 6 TB. The first solid state disk is configured to store laser point cloud data and thermal infrared image data, the second solid state disk is configured to store visible light image data, and the third solid state disk is configured to store hyperspectral image data and attitude position measurement data, so that the operation requirement of the entire system for more than 10 hours is met.

The real-time display and monitoring subsystem is configured to display data condition acquired by the sensors in real time in an operation process and monitor working state parameters of the sensors, as shown in FIG. 8, which includes a data analysis module and a data quick-view module. The data analysis module is configured to analyze a plurality of types of data and perform quick image preprocessing; and the data quick-view module is configured to display generated graphs in different quick-view modes such as scrolling, refreshing and changing scene.

The present application provides a multi-source aerial remote sensing data acquisition control method, as shown FIG. 9, which includes the following steps:

- S1: connecting power lines, trigger lines and data lines of sensors, and electrifying devices;
- S2: performing multi-sensor integrated control by a host computer control software in the integrated control subsystem, configuring parameters of the sensor, setting a width and period of a trigger pulse, and transmitting a setting instruction to a main control circuit board;
- S3: starting operation and data acquisition of the sensors in one key by manual operation, acquiring calibration parameters after sensor calibration flight, and then synchronously acquiring and storing aerial remote sensing data; and
- S4: displaying key parameters and operating states of the sensors in real time in the acquisition process, displaying data acquired by the sensors in a quick view mode, and stopping operation and data acquisition of the sensors in one key after the task is completed.

Further, a multi-source aerial remote sensing data acquisition control method is mainly achieved by the following two aspects. The designed mounting reference structure ensures stability and reliability, the observation fields of view of the sensors are matched and correspond, the sensors are orthogonally aligned with a reference shaft system of the high-precision inertial measurement unit, and the arrangement relationship between the sensors is stable and unchanged. In addition, a designed integrated control subsystem is adopted for centralized and unified control on the sensors, so that high-precision clock synchronization of the sensors is achieved.

The sensor calibration method mainly calibrates the collimation axis of the laser radar 1 to reduce the placement error between the sensors and the inertial measurement unit IMU 5.

Specifically, the sensor calibration in S3 is specifically as follows:

- S31: selecting and laying out a calibration site, wherein the calibration site is provided with buildings for calibration of the laser radar 1, and ground objects have reflectivity;
- S32. setting up a calibration route, and uniformly distributing a plurality of control points along a route direction by adopting a vertical crossing and large lateral overlapping laying method;
- S33: flying according to the set calibration route, and acquiring laser radar point cloud data;
- S34: automatically extracting a connecting surface between overlapping flight strips, and acquiring barycentric coordinates ($X_{84}$, $Y_{84}$, $Z_{84}$) of the connecting surface;
- S35: taking the barycentric coordinates as connection points of different flight strips, and then establishing an error equation according to a difference between the barycentric coordinates of the connecting surface and an observation equation of laser foot points; and
- S36: setting N connection points, establishing N error equations, and solving an error of an installation angle by applying a least square principle.

Specifically, the S36 includes an included angle between the laser radar 1 and the inertial measurement unit IMU 5 in the roll, pitch and heading directions.

Further, the step of synchronously acquiring and storing aerial remote sensing data in S3 is specifically as follows:

- S331: Establishing a time reference based on GNSS information and a differential crystal oscillator provided by the integrated navigation host 19.

Specifically, step I: a high-precision time unit in the time synchronization module is initialized, and two counters are created: a second-level time counter and a differential crystal oscillator pulse counter, which are configured to record PPS second pulse signals and pulse signals input by the differential crystal oscillator.

- Step II: the high-precision time unit receives the GPRMC message data output by the integrated navigation host 19, and the format is: GPRMC<field 1>, <field 2>, <field 3> . . . , which contains time information and positioning information.
- Step III: the precise time information in the GPRMC message data is analyzed by the high-precision time unit, and the information is converted into the form of total seconds, and then the second-level time counter is initialized using this value.
- Step IV: the differential crystal oscillator pulse counter is used to count the pulses input by the differential crystal oscillator, and the transition edge of the PPS second pulse signal input by the integrated navigation host 19 is monitored. When the PPS second pulse signal generates a rising edge, the differential crystal oscillator pulse counter is cleared and restarted from 0, and the count value of the second-level time counter is increased by 1.
- Step V: the two counters are integrated and accumulated to obtain a high-precision time reference for unifying the sensors. The second-level time counter records the total number of seconds at the current moment, and the differential crystal oscillator pulse counter records the time from the current second to the next second.

S332: Calibrating measurement time of the inertial measurement unit IMU 5 by using 1PPS signal sent by the integrated navigation host 19.

Specifically, step I: an embedded microcontroller unit in the multi-sensor synchronization control module simultaneously receives 1PPS signal sent by the integrated navigation host 19 and sampling pulse signals sent by the IMU. After the 1PPS second pulse signals are triggered, the second-level time counter is used to obtain the GNSS full second time triggered by the first 1PPS second pulse signals.

Step II: an IMU sampling counter is created, and the IMU sampling counter performs sampling at a higher frequency and records the number of sampling times in the IMU sampling counter. The embedded microcontroller unit is used to decode the data acquired each time and compare the data with the count of the second-level time counter at the previous moment to determine whether the second-level time has changed.

Step III: the time of IMU data is determined by an judgment result. If the second-level time has not changed, the IMU sampling counter results at current and previous moments are subtracted, and then divided by the local crystal oscillator frequency to obtain the time interval between the two moments. The time interval is superimposed on the time of the IMU data at the previous moment to obtain the time of the current IMU data. If the second-level time has changed, whether it is a 1PPS abnormality is first determined by the magnitude of the change. If the change amplitude is not within the normal range of the local crystal oscillator frequency, it is determined to be 1PPS abnormality, and the IMU data time is calculated in the manner that the second-level time has not changed. If it is determined to be a normal trigger of the next 1PPS, the current IMU sampling counter result is subtracted from the second-level time result, and divided by the local crystal oscillator frequency to obtain the time difference between the current and full second moments. The time of the current IMU data is obtained by adding the difference to the second-level time.

S333: Reducing GNSS observation data delay and data update calculation delay of the inertial measurement unit IMU 5 by using an improved Kalman filtering algorithm.

Specifically, step I: when the integrated navigation host 19 starts to sample GNSS signals, saving output values of an IMU accelerometer and a gyroscope, and when GNSS observation data are actually received, starting calculating and updating an attitude, a velocity and a position of the current flight platform in real time;

firstly, performing attitude solution by using an attitude differential equation;

$$\dot{C}_b^i = C_b^i(\omega_{ib}^b \times) \text{ and } \dot{C}_i^n = (\omega_{ni}^n \times)C_i^n = (-\omega_{in}^n \times)C_i^n,$$

and updating an attitude matrix from a moment $t_{k-1}$ to a moment $t_k$ by adopting a formula:

$$C_{b(k)}^i = C_{b(k-1)}^i c_{b(k)}^{b(k-1)},\ C_i^{n(k)} = C_{n(k-1)}^{n(k)} C_i^{n(k-1)};$$

wherein b represents a flight platform coordinate system, i represents an inertial coordinate system, n represents a navigation coordinate system, a matrix $$C_b^i$$

is an attitude relationship of b system relative to i system expressed by quaternion, $$\dot{C}_b^i$$

represents a differential of $$C_b^i$$

relative to time, $$\dot{C}_i^n$$

represents a differential of $$C_i^n$$

with respect to time, $$\omega_{ni}^n$$

represents a projection of an angular velocity of i system relative to n system in n system, $$\omega_{in}^n$$

represents a projection of an angular velocity of n system relative to i system in n system, $$C_i^n$$

represents an attitude conversion matrix from the inertial coordinate system to the navigation coordinate system $$\omega_{ib}^b$$

represents direct output of the IMU, which is a projection of an angular velocity of b system relative to i system in b system, $$C_{b(k)}^{b(k-1)}$$

represents a rotation change of b system from moment $t_{k-1}$ to moment $t_k$ when i system is used as a reference, which is determined by $$\omega_{ib}^{b}, C_{b(k)}^{i}$$

represents an attitude conversion matrix from the flight platform coordinate system to the inertial coordinate system at a moment $t_k$, $$C_{b(k-1)}^{i}$$

represents an attitude conversion matrix from the flight platform coordinate system to the inertial coordinate system at a moment $t_{k-1}$, $$C_{i}^{n(k)}$$

represents an attitude conversion matrix from the inertial coordinate system to the navigation coordinate system at a moment $t_k$, $$C_{n(k-1)}^{n(k)}$$

represents a rotation change of n system from moment $t_{k-1}$ to moment $t_k$, and $$C_{i}^{n(k-1)}$$

represents an attitude conversion matrix from the inertial coordinate system to the navigation coordinate system at a moment $t_{k-1}$;

then updating velocity state by using a velocity differential equation and performing integration to obtain:

$$V_k^{n(k)} = V_{k-1}^{n(k-1)} + \Delta V_{sf(k)}^{n} + \Delta V_{cor/g(k)}^{n}, V_{k-1}^{n(k-1)}$$

is a velocity at a moment $t_{k-1}$, $$\Delta V_{sf(k)}^{n}$$

is velocity increment or an n-system specific force, $$\Delta V_{cor/g(k)}^{n}$$

is velocity increment of a harmful acceleration, $$V_k^{n(k)}$$

is a velocity at a moment $t_k$; and finally, performing position update calculation by using a position differential equation:

$$P_k = P_{k-1} + M_{k-\frac{1}{2}}(V_{k-1}^{n} + V_k^{n})\frac{\Delta T}{2},$$

$P_k$ is a position state matrix at a moment $t_k$, $$V_k^{n}$$

is a velocity value output by IMU at a moment $t_k$, $$M_{k-\frac{1}{2}}$$

is a conversion matrix, $P_{k-1}$ is a position state matrix at a moment $t_{k-1}$, $$V_{k-1}^{n}$$

is a velocity value output at a moment $t_{k-1}$, and $\Delta T$ is time increment.

Step II: firstly, calculating a state parameter estimator and a state parameter covariance estimator at the GNSS sampling moment (a moment $t_k$), then transferring the state parameter estimator and the state parameter covariance estimator to a current moment (completing calculation update at a moment $t_j$, j>k), performing state transfer by the simultaneous formula $$\hat{X}_{j,k}^{-} = \Phi_{j/k}\hat{X}_k^{+} \text{ and } P_{j,k}^{-} = \Phi_{j/k}P_k^{+}\Phi_{j,k}^{T} + M_{j,k+1},$$

and correcting a delay error of the current moment: wherein $$\hat{X}_{j,k}^{-}$$

is a linear minimum variance estimate of a state parameter vector $X_j$ at a moment $t_j$ made by k observation vector values at moment $t_k$ to $t_j$, $\Phi_{j/k}$ is a state transfer matrix, $$\hat{X}_k^{+}$$

is an updated estimate or the state parameter vector $X_k$ at a moment $t_k$, $$P_{j,k}^{-}$$

is a covariance matrix of a prediction error, $$P_k^{+}$$

is a covariance matrix of a state parameter, $$\Phi_{j,k}^{T}$$

is a transpose of a state transfer matrix, and $M_{j,k+1}$ is a correction matrix factor.

S334: Performing timing on the laser radar 1, the hyperspectral camera 2, the visible light camera 3 and the thermal infrared camera 4 by using the sensor timing unit, and completing synchronous acquisition of multi-source aerial remote sensing data.

Specifically, firstly, a sensor timing unit in the time synchronization module is used to monitor the rising edge of a PPS pulse signal sent by the integrated navigation host 19, and the GPRMC message information sent by the integrated navigation host 19 is cached to a data queue; when the rising edge of a PPS pulse signal is monitored, the sensor timing unit takes out the latest complete GPRMC message information from the data queue within a fixed time interval, and transmits the analyzed standard time information to the laser radar 1 to complete timing of the laser radar 1; and after the laser radar 1 is timed, the acquired point cloud data frames are all attached with standard timestamp information.

Then, the sensor timing unit in the time synchronization module is used to perform frequency division on a pulse signal of the differential crystal oscillator, an electric signal with a certain frequency is generated to serve as a trigger acquisition signal of the hyperspectral camera 2, and data acquisition is performed when the hyperspectral camera 2 receives the signal and monitors a rising edge. Meanwhile, the sensor timing unit monitors the pulse information constantly, and attaches a corresponding timestamp to the hyperspectral camera data when the rising edge of the pulse signal is monitored by taking the time information provided by the high-precision time unit as a reference, so that the timing of the hyperspectral camera 2 is completed.

Specifically, the timing and data acquisition methods of the visible light camera 3 and the thermal infrared camera 4 are similar to those of the hyperspectral camera 2.

The above description of the disclosed embodiments enables those skilled in the art to implement or use the present application. Various modifications to these embodiments will be readily apparent to those skilled in the art, and the generic principles defined herein may be applied to other embodiments without departing from the spirit or scope of the present application. Thus, the present application is not intended to be limited to these embodiments shown herein but is to be accorded the broadest scope consistent with the principles and novel features disclosed herein.

What is claimed is:

1. A multi-source aerial remote sensing data acquisition apparatus, comprising:

a flight platform and onboard equipment arranged on the flight platform; wherein the onboard equipment comprises: a multi-sensor ultra-compact integrated device, an onboard integrated synchronization control device, and a global navigation satellite system (GNSS) receiving antenna; the multi-sensor ultra-compact integrated device is connected to the onboard integrated synchronization control device via a cable, and the GNSS receiving antenna is arranged on an upper end face of the flight platform;

the multi-sensor ultra-compact integrated device is configured to acquire multi-source remote sensing data;

the onboard integrated synchronization control device is configured to control an operation of the multi-sensor ultra-compact integrated device;

the GNSS receiving antenna is configured to convert radio signals transmitted by satellites into electrical current for use by receiver electronics;

the multi-sensor ultra-compact integrated device comprises: a laser radar, a hyperspectral camera, a visible light camera, a thermal infrared camera, an inertial measurement unit (IMU), and a reference mounting plate;

the reference mounting plate is provided with mounting reference edges of sensors and is configured to provide a mounting reference structure for a plurality of types of sensors;

the laser radar, the visible light camera and the thermal infrared camera are all mounted at a lower end face of the reference mounting plate;

the hyperspectral camera and the IMU are arranged at an upper end face of the reference mounting plate;

the multi-sensor ultra-compact integrated device is formed by rigidly connecting and combining a plurality of types of remote sensing sensors through the reference mounting plate by adopting an upper and lower layered structure;

the reference mounting plate is further provided with a tail support, a bottom mounting frame, a top mounting frame and a plurality of shock absorbers;

the tail support is arranged on a lower end face of the reference mounting plate and is fixed on a side of the laser radar by first bolts;

the bottom mounting frame is arranged on the lower end face of the reference mounting plate and is fixed to the side of the laser radar corresponding to the tail support by second bolts, and the visible light camera and the thermal infrared camera are fixedly connected to the bottom mounting frame by third bolts;

the top mounting frame is arranged on an upper end face of the reference mounting plate and is fixedly connected to the hyperspectral camera by fourth bolts; and the plurality of shock absorbers are arranged at the lower end face of the reference mounting plate, positioned at four corners of the reference mounting plate, and fixedly connected to the reference mounting plate by fifth bolts, and the plurality of shock absorbers are configured to reduce an impact of platform vibration on sensors during flight.

2. The multi-source aerial remote sensing data acquisition apparatus according to claim 1, wherein the onboard integrated synchronization control device comprises: an industrial control host, an integrated power supply and distribution module, an integrated navigation host, a telescopic control console, a display, an aviation shock absorption cabinet, and a data storage unit;

the aviation shock absorption cabinet is configured to integrate the industrial control host, the integrated power supply and distribution module, the integrated navigation host, the telescopic control console, the display and the data storage unit;

the industrial control host, the integrated power supply and distribution module and the data storage unit are all arranged inside the aviation shock absorption cabinet and are fixedly connected to the aviation shock absorption cabinet by sixth bolts;

the industrial control host is configured to send instructions to functional modules, control power-on, acquisition, and storage working states of the sensors, and set working parameters of the sensors; the integrated power supply and distribution module is configured to convert a power supply voltage of the flight platform to meet power consumption requirements of the sensors; the data storage unit is configured to store laser point clouds, hyperspectral images, thermal infrared images and visible light image generated in a data acquisition process;

an end of the telescopic control console is embedded in a side of the aviation shock absorption cabinet far away from the data storage unit, a side of the telescopic control console extends out of the aviation shock absorption cabinet, and the telescopic control console is configured to manually operate the industrial control host;

the integrated navigation host is arranged on the aviation shock absorption cabinet, positioned at a same side as the telescopic control console, and fixedly connected to the aviation shock absorption cabinet by seventh bolts, and the integrated navigation host is configured to receive and fuse measurement data from a global navigation satellite system and the IMU to obtain a three-dimensional position, a velocity and an attitude; and the display is arranged on the aviation shock absorption cabinet, positioned at the same side as the telescopic control console and positioned above the telescopic control console; and the display is fixedly connected to the aviation shock absorption cabinet by eighth bolts and configured to display working parameters of devices and display working state and data acquisition quality of the sensors in real time during working.

3. A multi-source aerial remote sensing data acquisition system, comprising the multi-source aerial remote sensing data acquisition apparatus according to claim 1, a power supply and distribution subsystem, an integrated control subsystem, a high-capacity data high-speed storage subsystem and a real-time display and monitoring subsystem; wherein the power supply and distribution subsystem is configured to distribute power supplies meeting voltage and power requirements to sensors and other electrical devices;

the integrated control subsystem is configured to send a control instruction, centrally control a plurality of sensors to perform data acquisition, storage and display operations, and achieve time synchronization of the sensors;

the high-capacity data high-speed storage subsystem is configured to meet storage requirements of large data volumes and high data rates of the plurality of sensors; and the real-time display and monitoring subsystem is configured to display data condition acquired by the sensors in real time in an operation process and monitor working state parameters of the sensors.

4. The multi-source aerial remote sensing data acquisition system according to claim 3, wherein the power supply and distribution subsystem comprises an isolated direct current/direct current (DC/DC) module and a rack-mounted inverter; wherein the isolated DC/DC module is configured to perform voltage conversion on a direct-current power supply provided by the flight platform;

the rack-mounted inverter is configured to convert direct current into alternating current and convert direct current voltage input by the isolated DC/DC module into alternating current voltage;

the integrated control subsystem comprises a time synchronization module and a multi-sensor synchronization control module; wherein the time synchronization module comprises a high-precision time unit and a sensor timing unit and is configured to establish a high-precision time reference; and the multi-sensor synchronization control module is configured to comprehensively control the plurality of sensors for data acquisition, storage and display operations.

5. The multi-source aerial remote sensing data acquisition system according to claim 3, wherein the high-capacity data high-speed storage subsystem comprises an Oculink connector and a disk array and is configured to store data acquired by the plurality of sensors on board in real time;

the Oculink connector is configured to connect the disk array to the integrated control subsystem for Peripheral Component Interconnect Express 4.0 (PCIE4.0) connection between the disk array and the integrated control subsystem;

the disk array comprises a first solid state disk, a second solid state disk and a third solid state disk, wherein the first solid state disk is configured to store laser point cloud data and thermal infrared image data, the second solid state disk is configured to store visible light image data, and the third solid state disk is configured to store hyperspectral image data and attitude position measurement data;

the real-time display and monitoring subsystem comprises a data analysis module and a data quick-view module;

the data analysis module is configured to analyze a plurality of types of data and perform quick image preprocessing; and the data quick-view module is configured to display generated graphs in different quick-view modes comprising scrolling, refreshing and changing scene.

6. A multi-source aerial remote sensing data acquisition control method, applied to the multi-source aerial remote sensing data acquisition system according to claim 3, and comprising the following steps:

S1: connecting power lines, trigger lines and data lines of sensors, and electrifying devices;

S2: performing multi-sensor integrated control by a host computer control software in the integrated control subsystem, configuring parameters of the sensors, setting a width and period of a trigger pulse, and transmitting a setting instruction to a main control circuit board;

S3: starting operation and data acquisition of the sensors in one key by manual operation, acquiring calibration parameters after sensor calibration flight, and then synchronously acquiring and storing aerial remote sensing data; and S4: displaying key parameters and operating states of the sensors in real time in an acquisition process, displaying data acquired by the sensors in a quick view mode, and stopping operation and data acquisition of the sensors in one key after a task is completed.

7. The multi-source aerial remote sensing data acquisition control method according to claim 6, wherein sensor calibration in step S3 comprises:

selecting and laying out a calibration site, wherein the calibration site is provided with buildings for laser radar calibration, and ground objects have reflectivity;

setting up a calibration route, and uniformly distributing a plurality of control points along a route direction by adopting a vertical crossing and large lateral overlapping laying method;

flying according to the calibration route, and acquiring laser radar point cloud data;

automatically extracting a connecting surface between overlapping flight strips, and acquiring barycentric coordinates of the connecting surface;

taking the barycentric coordinates as connection points of different flight strips, and then establishing an error equation according to a difference between the barycentric coordinates of the connecting surface and an observation equation of laser foot points; and setting N connection points, establishing N error equations, and solving an error of an installation angle by applying a least square principle.

8. The multi-source aerial remote sensing data acquisition control method according to claim 6, wherein the step of synchronously acquiring and storing the aerial remote sensing data in S3 comprises:

establishing a time reference based on GNSS information and a differential crystal oscillator provided by the integrated navigation host;

calibrating measurement time of the IMU by using 1 pulse per second (1PPS) signal sent by the integrated navigation host;

reducing GNSS observation data delay and data update calculation delay of the IMU by using an improved Kalman filtering algorithm; and performing timing on the laser radar, the hyperspectral camera, the visible light camera and the thermal infrared camera by using the sensor timing unit, and completing synchronous acquisition of multi-source aerial remote sensing data.

9. The multi-source aerial remote sensing data acquisition control method according to claim 8, wherein reducing GNSS observation data delay and data update calculation delay of the IMU by using an improved Kalman filtering algorithm comprises:

step I: when the integrated navigation host starts to sample GNSS signals, saving output values of an IMU accelerometer and a gyroscope, and when GNSS observation data are actually received, starting calculating and updating an attitude, a velocity and a position of the flight platform in real time;

firstly, performing attitude solution by using an attitude differential equation:

$$\dot{C}_b^i = C_b^i(\omega_{ib}^b \times) \text{ and } \dot{C}_i^n = (\omega_{ni}^n \times)C_i^n = (-\omega_{in}^n \times)C_i^n,$$

and updating an attitude matrix from a moment $t_{k-1}$ to a moment $t_k$ by adopting a formula:

$$C_{b(k)}^i = C_{b(k-1)}^i C_{b(k)}^{b(k-1)},\ C_i^{n(k)} = C_{n(k-1)}^{n(k)} C_i^{n(k-1)};$$

wherein b represents a flight platform coordinate system, i represents an inertial coordinate system, n represents a navigation coordinate system, a matrix $$C_b^i$$

is an attitude relationship of b system relative to i system expressed by quaternion, $$\dot{C}_b^i$$

represents a differential of $$C_b^i$$

relative to time, $$\dot{C}_i^n$$

represents a differential of $$C_i^n$$

with respect to time, $$\omega_{ni}^n$$

represents a projection of an angular velocity of i system relative to n system in n system, $$\omega_{in}^n$$

represents a projection of an angular velocity of n system relative to i system in n system, $$C_i^n$$

represents an attitude conversion matrix from the inertial coordinate system to the navigation coordinate system, $$\omega_{ib}^b$$

represents direct output of the IMU and is a projection of an angular velocity of b system relative to i system in b system, $$C_{b(k)}^{b(k-1)}$$

represents a rotation change of b system from moment $t_{k-1}$ to moment $t_k$ when i system is used as a reference and is determined by $$\omega_{ib}^{b},\ C_{b(k)}^{i}$$

represents an attitude conversion matrix from the flight platform coordinate system to the inertial coordinate system at a moment $t_k$, $$C_{b(k-1)}^{i}$$

represents an attitude conversion matrix from the flight platform coordinate system to the inertial coordinate system at a moment $t_{k-1}$, $$C_{i}^{n(k)}$$

represents an attitude conversion matrix from the inertial coordinate system to the navigation coordinate system at a moment $t_k$, $$C_{n(k-1)}^{n(k)}$$

represents a rotation change of n system from moment $t_{k-1}$ to moment $t_k$, and $$C_{i}^{n(k-1)}$$

represents an attitude conversion matrix from the inertial coordinate system to the navigation coordinate system at a moment $t_{k-1}$;

then updating velocity state by using a velocity differential equation and performing integration to obtain:

$$V_k^{n(k)} = V_{k-1}^{n(k-1)} + \Delta V_{sf(k)}^{n} + \Delta V_{cor/g(k)}^{n},$$

wherein $$V_{k-1}^{n(k-1)}$$

is a velocity at a moment $t_{k-1}$, $$\Delta V_{sf(k)}^{n}$$

is velocity increment of an n-system specific force, $$\Delta V_{cor/g(k)}^{n}$$

is velocity increment of a harmful acceleration, and $$V_k^{n(k)}$$

is a velocity at a moment $t_k$; and finally, performing position update calculation by using a position differential equation:

$$P_k = P_{k-1} + M_{k-\frac{1}{2}}(V_{k-1}^{n} + V_k^{n})\frac{\Delta T}{2},$$

wherein $P_k$ is a position state matrix at a moment $t_k$, $$V_k^{n}$$

is a velocity value output by the IMU at a moment $t_k$, $$M_{k-\frac{1}{2}}$$

is a conversion matrix, $P_{k-1}$ is a position state matrix at a moment $t_{k-1}$, $$V_{k-1}^{n}$$

is a velocity value output at a moment $t_{k-1}$, and $\Delta T$ is time increment; and step II: firstly, calculating a state parameter estimator and a state parameter covariance estimator at the GNSS sampling, i.e., a moment $t_k$, then transferring the state parameter estimator and the state parameter covariance estimator to a current moment, that is, completing calculation update at a moment $t_j$, j>k, performing state transfer by the following formula, and correcting a delay error of the current moment:

$$\hat{X}_{j,k}^{-} = \Phi_{j/k}\hat{X}_k^{+},\ P_{j,k}^{-} = \Phi_{j,k}P_k^{+}\Phi_{j,k}^{T} + M_{j,k+1},$$

wherein $$\hat{X}_{j,k}^{-}$$

is a linear minimum variance estimate of a state parameter vector $X_j$ at a moment $t_j$ made by k observation vector values between moment $t_k$ and moment $t_j$, $\Phi_{j/k}$ is a state transfer matrix, $$\hat{X}_k^+$$

is an updated estimate of the state parameter vector $X_k$ at a moment $t_k$, $$P_{j,k}^-$$

a covariance matrix or a prediction error, $$P_k^+$$

is a covariance matrix of a state parameter, $$\Phi_{j,k}^T$$

is a transpose or a state transfer matrix, and $M_{j,k+1}$ is a correction matrix factor.

10. The multi-source aerial remote sensing data acquisition system according to claim 3, wherein in the multi-source aerial remote sensing data acquisition apparatus, the onboard integrated synchronization control device comprises: an industrial control host, an integrated power supply and distribution module, an integrated navigation host, a telescopic control console, a display, an aviation shock absorption cabinet, and a data storage unit;

the aviation shock absorption cabinet is configured to integrate the industrial control host, the integrated power supply and distribution module, the integrated navigation host, the telescopic control console, the display and the data storage unit;

the industrial control host, the integrated power supply and distribution module and the data storage unit are all arranged inside the aviation shock absorption cabinet and are fixedly connected to the aviation shock absorption cabinet by sixth bolts;

the industrial control host is configured to send instructions to functional modules, control power-on, acquisition, and storage working states of the sensors, and set working parameters of the sensors; the integrated power supply and distribution module is configured to convert a power supply voltage of the flight platform to meet power consumption requirements of the sensors; the data storage unit is configured to store laser point clouds, hyperspectral images, thermal infrared images and visible light image generated in a data acquisition process;

an end of the telescopic control console is embedded in a side of the aviation shock absorption cabinet far away from the data storage unit, a side of the telescopic control console extends out of the aviation shock absorption cabinet, and the telescopic control console is configured to manually operate the industrial control host;

the integrated navigation host is arranged on the aviation shock absorption cabinet, positioned at a same side as the telescopic control console, and fixedly connected to the aviation shock absorption cabinet by seventh bolts, and the integrated navigation host is configured to receive and fuse measurement data from a global navigation satellite system and the IMU to obtain a three-dimensional position, a velocity and an attitude; and the display is arranged on the aviation shock absorption cabinet, positioned at the same side as the telescopic control console and positioned above the telescopic control console; and the display is fixedly connected to the aviation shock absorption cabinet by eighth bolts and configured to display working parameters of devices and display working state and data acquisition quality of the sensors in real time during working.

11. The multi-source aerial remote sensing data acquisition control method according to claim 6, wherein in the multi-source aerial remote sensing data acquisition system, the power supply and distribution subsystem comprises an isolated DC/DC module and a rack-mounted inverter; wherein the isolated DC/DC module is configured to perform voltage conversion on a direct-current power supply provided by the flight platform;

the rack-mounted inverter is configured to convert direct current into alternating current and convert direct current voltage input by the isolated DC/DC module into alternating current voltage;

the integrated control subsystem comprises a time synchronization module and a multi-sensor synchronization control module; wherein the time synchronization module comprises a high-precision time unit and a sensor timing unit and is configured to establish a high-precision time reference; and the multi-sensor synchronization control module is configured to comprehensively control the plurality of sensors for data acquisition, storage and display operations.

12. The multi-source aerial remote sensing data acquisition control method according to claim 6, wherein in the multi-source aerial remote sensing data acquisition system, the high-capacity data high-speed storage subsystem comprises an Oculink connector and a disk array and is configured to store data acquired by the plurality of sensors on board in real time;

the Oculink connector is configured to connect the disk array to the integrated control subsystem for PCIE4.0 connection between the disk array and the integrated control subsystem;

the disk array comprises a first solid state disk, a second solid state disk and a third solid state disk, wherein the first solid state disk is configured to store laser point cloud data and thermal infrared image data, the second solid state disk is configured to store visible light image data, and the third solid state disk is configured to store hyperspectral image data and attitude position measurement data;

the real-time display and monitoring subsystem comprises a data analysis module and a data quick-view module;

the data analysis module is configured to analyze a plurality of types of data and perform quick image preprocessing; and the data quick-view module is configured to display generated graphs in different quick-view modes comprising scrolling, refreshing and changing scene.

* * * * *